(12) United States Patent
Siegert

(10) Patent No.: US 12,512,862 B2
(45) Date of Patent: Dec. 30, 2025

(54) HYBRID MODULE WITH RESILIENT PIN

(71) Applicant: Rohde & Schwarz GmbH & Co. KG, Munich (DE)

(72) Inventor: Florian Siegert, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 293 days.

(21) Appl. No.: 18/512,469

(22) Filed: Nov. 17, 2023

(65) Prior Publication Data
US 2025/0167817 A1    May 22, 2025

(51) Int. Cl.
*H04B 1/03*    (2006.01)

(52) U.S. Cl.
CPC ...................... *H04B 1/03* (2013.01)

(58) Field of Classification Search
CPC ......................................... H04B 1/03
See application file for complete search history.

(56) References Cited

U.S. PATENT DOCUMENTS

| | | | | |
|---|---|---|---|---|
| 11,675,316 B2* | 6/2023 | Fruehling | ............... | H03L 7/26 |
| | | | | 455/90.1 |
| 2002/0013098 A1* | 1/2002 | Triepels | ............... | H05K 3/325 |
| | | | | 439/625 |
| 2003/0169134 A1* | 9/2003 | Ammar | ............... | H01L 24/49 |
| | | | | 257/E23.114 |

FOREIGN PATENT DOCUMENTS

| | | |
|---|---|---|
| WO | 2000/054373 A1 | 9/2000 |
| WO | 2003/079565 A1 | 9/2003 |

* cited by examiner

*Primary Examiner* — David Bilodeau
(74) *Attorney, Agent, or Firm* — Studebaker Brackett PLLC

(57) ABSTRACT

A hybrid module includes a microwave frequency circuit submodule configured for processing microwaves having a high frequency and a low frequency circuit submodule. The low frequency circuit submodule is opposite to the microwave frequency circuit submodule and supplies the microwave frequency circuit submodule with an electrical signal having a low frequency. The high frequency is at least two times higher than the low frequency. The hybrid module includes a first conductive housing part that houses at least part of the low frequency circuit submodule, and a second conductive housing part that houses at least part of the microwave frequency circuit submodule. A resilient pin is mounted to the low frequency circuit submodule. The resilient pin releasably contacts the microwave frequency circuit submodule to provides, between the submodules, a connection, so that via the connection the low frequency circuit submodule can supply the microwave frequency circuit submodule with the electrical signal.

20 Claims, 4 Drawing Sheets

HYBRID MODULE WITH RESILIENT PIN

TECHNICAL FIELD

The invention relates to a hybrid module and to a measuring device comprising such a hybrid module.

BACKGROUND ART

In microwave frequency applications, an electrical connection between components is provided for the provision of, for example, a (DC) voltage and control signals.

SUMMARY

According to an aspect of the present disclosure, a hybrid module is provided. The hybrid module comprises: a microwave frequency circuit submodule configured for processing microwaves having a high frequency; a low frequency circuit submodule, wherein the low frequency circuit submodule is arranged opposite to the microwave frequency circuit submodule, and wherein the low frequency circuit submodule is configured to supply the microwave frequency circuit submodule with an electrical signal having a low frequency, wherein the high frequency is at least two times higher than the low frequency; a first conductive housing part that houses at least part of the low frequency circuit submodule; a second conductive housing part that houses at least part of the microwave frequency circuit submodule; and a resilient pin mounted to the low frequency circuit submodule, wherein the resilient pin is adapted to releasably contact the microwave frequency circuit submodule in order to provide, between the submodules, a connection, so that via the connection the low frequency circuit submodule can supply the microwave frequency circuit submodule with the electrical signal.

In the context of the present disclosure, the low frequency is to be understood such that the electrical signal may have no or almost no frequency (0 Hz). For example, the low frequency may be in a range of 0 Hz to ⅒*high frequency.

In the context of the present disclosure, "processing microwaves" is understood broadly and may include, for example, amplification, filtering, mixing, attenuating, multiplying (frequency) and/or modulating.

An advantage of the hybrid module is that a shielding of radiation can be achieved, while at the same time a low cost module is provided. In particular, expensive components and/or manufacturing techniques for electrically connecting the submodules with one another (such as feedthrough filters, press-in operations, brazing, and/or welding) can be eliminated or at least significantly reduced. Further, the hybrid module achieves the advantage of compactness. For example, electrical contacts can be directly arranged above the microwave frequency circuit submodule, whereby also a frequency response can be improved and losses reduced.

In an embodiment, the high frequency is at least ten times higher than the low frequency. The high frequency may be 10 GHz or more, optionally 20 GHz or more.

In an embodiment, the low frequency circuit submodule comprises a low frequency circuit substrate, such as a circuit board. The circuit board may comprise an FR4 material.

The low frequency circuit substrate may comprise a conductive layer. This achieves the advantage that the conductive layer can act as an additional shielding, namely a shielding in addition to the shielding provided by the conductive housing parts. By the conductive layer, an electrical device of the low frequency circuit submodule can be prevented from being interfered due to undesired radiation, e.g. coming from the microwave frequency circuit submodule. The conductive layer may be connected to ground. The conductive cover layer is understood as an outer layer of the low frequency circuit substrate.

The conductive layer may be a conductive cover layer, which optionally faces the microwave frequency circuit submodule, or an intermediate or middle layer. In particular, the conductive layer facing the microwave frequency circuit submodule can be provided easily, e.g. by simply applying the conductive layer on a backside of the low frequency circuit substrate, which reduces costs. In particular, the conductive layer may be (directly) exposed to microwave radiation to which also the microwave frequency circuit submodule is exposed. If the conductive layer is provided as an intermediate or middle layer, the conductive layer may be arranged between a first outer layer facing the low frequency circuit submodule and a second outer layer facing the microwave frequency circuit submodule.

In an embodiment, the low frequency circuit substrate comprises a conductor such as a via, wherein the resilient pin is in electrical contact with the conductor. Thus, an electrical connection can be provided in an easy and thus cost-saving manner.

In an embodiment, the low frequency circuit submodule comprises an opening, such as a through opening (e.g. a through hole) or a recess, wherein at least part of the resilient pin is arranged in the opening.

The resilient pin may be mounted to the opening by a form and/or frictional fit. In an embodiment, the resilient pin is fitted into the opening by a transition or press fit.

At least part of the conductor may be arranged in the opening, e.g. on a (side) wall delimiting the opening.

The wall of the opening may be galvanized. In that case, the resilient pin is in electrical contact with the galvanized substrate, or wall, which is in turn used to transmit the electrical signal to the resilient pin. In other words, the conductor may be arranged in the opening by galvanization.

In an embodiment, the microwave frequency circuit submodule comprises a microwave frequency circuit substrate, such as a thin film substrate.

The microwave frequency circuit substrate may be contacted by the resilient pin from above. The microwave frequency circuit substrate may be supported by the second housing part from below.

The microwave frequency circuit substrate may comprise ceramic. In another embodiment, the microwave frequency circuit substrate may, additionally or alternatively, comprise a different material.

In an embodiment, the second conductive housing part delimits one or more receiving rooms in which at least part of the microwave frequency circuit submodule is arranged, wherein the resilient pin extends into the one or more receiving rooms and contacts the microwave frequency circuit substrate. This achieves the advantage of a very compact arrangement of the submodules with respect to one another. Thus, the hybrid module can be made further compact.

In an embodiment, there may be a plurality of receiving rooms which are separated from each other by the second conductive housing part, such as by a wall (e.g. a sidewall or an intermediate wall) of the second conductive housing.

In an embodiment, the low frequency circuit submodule delimits, or at least partly closes, the one or more receiving rooms. In other words, the low frequency circuit submodule can act as a lid for the second conductive housing part. This achieves the advantage that microwaves can be shielded with less parts.

For example, the second conductive housing part may delimit the one or more receiving rooms and an opening for accessing the one or more receiving rooms, wherein the low frequency circuit submodule covers at least part of the opening or, together with the resilient pin, all of the opening.

In an embodiment, the resilient pin comprises a base part and an end part, wherein the base part is mounted to the low frequency circuit submodule, and wherein the end part is moveable relative to the microwave frequency circuit submodule and/or relative to the base part. Thereby, the resilient pin may easily compensate for manufacturing tolerances (e.g. between the submodules).

The end part may be moveable relative to the base part, e.g. guided by, and/or within, the base part.

The end part may be moveable in, or along, an axial direction of the resilient pin.

The end part may be moveable (relative to the microwave frequency circuit submodule and/or relative to the base part; e.g. along a straight line) by at least 0.3 mm and/or by not more than 5 mm, such as by not more than 4 mm or by not more than 3 mm or by not more than 2 mm or by not more than 1 mm or by not more than 0.5 mm.

In an embodiment, the resilient pin comprises a resilient element, such as a spring, wherein at least part of the resilient element is arranged in the base part. The resilient element may comprise a first end connected to the base part and a second end connected to the end part.

The end part is not limited to a specific shape. For example, the end part, in particular a tip comprised by the end part, may comprise a section for contacting the microwave circuit submodule, which section has a flat, angled, and/or curved shape. The end part or the tip of the resilient pin, in particular said section, may have a obtused, dulled (e.g. round), and/or acute (e.g. pointy) shape. A flat, obtused, dulled or curved shape achieves the advantage that the contact is reproducible, even if the housing is opened, e.g. by removing one or both of the housing parts.

In an embodiment, the resilient pin is a pogo pin.

In an embodiment, at least part of the low frequency circuit submodule, such as the low frequency circuit substrate, and/or a sealing element is/are arranged, or sandwiched, between the housing parts. This further increases the compactness of the hybrid module.

For example, at least part of the low frequency circuit submodule and/or the sealing element may be arranged, or sandwiched, between the housing parts such that part of the low frequency circuit submodule, such as its low frequency circuit substrate, is visible from outside the housing parts, such as from a space in which the housing parts are arranged. In that case the low frequency circuit substrate is visible from outside the housing comprising the housing parts, i.e. from a space in which the hybrid module is arranged. However, it could also not be visible from the outside. In that case the housing parts of the respective submodules, such as their sidewalls, would rest at each other.

The at least part of the low frequency circuit submodule and/or the sealing element may be clamped between the housing parts.

In an embodiment, the first conductive housing part is in thermal contact, such as in direct contact and/or in indirect contact, e.g. by using a thermal conductive bond, with the low frequency circuit submodule. This achieves the advantage of a particularly good cooling of the low frequency circuit submodule.

In an embodiment, the second conductive housing part is in thermal contact, such as in direct contact and/or in indirect contact, e.g. using a thermal conductive bond, with the microwave frequency circuit submodule and/or the low frequency circuit submodule. This achieves the advantage of a particularly good cooling of the microwave frequency circuit submodule and/or low frequency circuit submodule.

In an embodiment, the first conductive housing part and/or the second conductive housing part comprise/s cooling fins. This achieves the advantage that a cooling effect for the submodule(s) can be further increased.

The hybrid module may comprise a fastening connection, such as a screw connection, that connects, e.g. indirectly via at least part of the low frequency circuit submodule and/or via the sealing element, the housing parts with one another. The fastening connection may extend, or go, at least from the first conductive housing part into the second conductive housing part. Fastening the fastening connection, e.g. by tightening the screw connection, may result in a clamping force applied to the low frequency circuit submodule, such as to the low frequency circuit substrate.

In an embodiment, the second conductive housing part may comprise a metal coating, such as a gold coating. The gold coating may be arranged such that, in an assembled state of the hybrid module, a part of the microwave frequency circuit submodule, such as the microwave frequency circuit substrate, and/or a part of the low frequency circuit submodule, such as the low frequency circuit substrate, is/are attached to (such as clamped to, pushed against and/or glued to) the gold coating. Optionally, the first conductive housing part is free of a gold coating. Thus, production of the module can be simplified. For example, the second conductive housing part may be gold-plated. The first and/or the second housing part may comprise a metal such as copper.

In an embodiment, the microwave frequency circuit submodule comprises a microwave device, such as a microwave monolithic integrated circuit (MMIC), an amplifier, a filter, and/or a device for increasing the frequency of a microwave signal.

In an embodiment, the electrical signal is in form of a voltage, such as a DC voltage, a ground connection, and/or a signal, such as an AC signal and/or a control signal.

In an embodiment, the (electrical) connection between the submodules is free of a feedthrough filter. Thus, a module can be provided that is particularly low cost. In other words, the connection between the submodules may be such that the connection can be provided by the resilient pin only.

The low frequency circuit substrate and/or the microwave frequency circuit substrate may comprise a ground plane. For example, the low frequency circuit substrate may comprise the ground plane in addition to the conductive layer or as the conductive layer. By the ground plane, a conductor of the respective substrate, such as a signal line, may be shielded against the coupling of other signals, such as other RF signals, into the conductor. If the conductor is arranged on a front side of the low frequency circuit substrate (or of the microwave frequency circuit substrate), the ground plane may be arranged on a back side of the low frequency circuit substrate (or of the microwave frequency circuit substrate). The low frequency circuit substrate (or the microwave frequency circuit substrate) may comprise one or more intermediate layers (sandwiched between the front and back sides of the respective substrate) comprising the ground plane or a plurality of the ground plane.

In an embodiment, the low frequency circuit substrate and/or the microwave frequency circuit comprises areas that do not comprise, or are not occupied by, a conductor, wherein at least part of these areas may be covered by the ground plane. The conductor(s) of the low frequency circuit substrate and/or of the microwave frequency circuit substrate, which conductor(s) may comprise copper, may be obtained by etching.

According to a further aspect of the present disclosure, a measuring device is provided, wherein the measuring device comprises a hybrid module as described above. The measuring device may be, for example, a spectral analyzer, a signal analyzer, a signal generator, a network analyzer, a power analyzer, and/or a broadcast analyzer.

BRIEF DESCRIPTION OF THE DRAWINGS

Exemplary embodiments of the present disclosure are now further explained with respect to the drawings by way of example only, and not for limitation. In the drawings:

FIG. 1 shows a module 100. The module 100 comprises a microwave device 101 mounted on a ceramic substrate 102. On the substrate 102, a conducting track 103 is provided. The track 103 is connected via a gold strip 104 to a feedthrough filter 105. More specifically, the strip 104 is connected to the feedthrough filter 105 via a material bond such as bonding, brazing, or welding. The feedthrough filter 105 is also electrically connected to a DC device 106 arranged on a circuit board 107, which may comprise an FR4-material. Through the circuit board 107, control signals and voltage can be fed to the feedthrough filter 105 and thus to the microwave device 101. The feedthrough filter 105 extends through a metal housing 108, namely through a middle part 108.1 of the housing 108. The housing 108 is arranged to shield the module 100, in particular such that no detrimental radiation can come into or out of the module 100, in particular into the DC device 106. On its backside, the substrate 102 may be provided with a gold layer 109 acting as a ground area. The layer 109 is arranged between the substrate 102 and a part of the housing 108.

FIG. 2 shows a module of the type shown in FIG. 1, in particular the strips 104 and feedthrough filters 105 are shown. The elements 104, 105 electrically connect the microwave device 101 to the DC device(s) 106.

FIG. 3 shows a hybrid module 1 according to an embodiment of the present disclosure. The hybrid module 1 comprises a microwave frequency circuit submodule 2 configured for microwaves having a high frequency, such as a frequency of 10 GHz or more, optionally 20 GHz or more. The microwave frequency circuit submodule 2 being configured for microwaves means that, for example, the microwave frequency circuit submodule 2 can process the microwaves and/or operate based on the microwaves.

Figure 1:
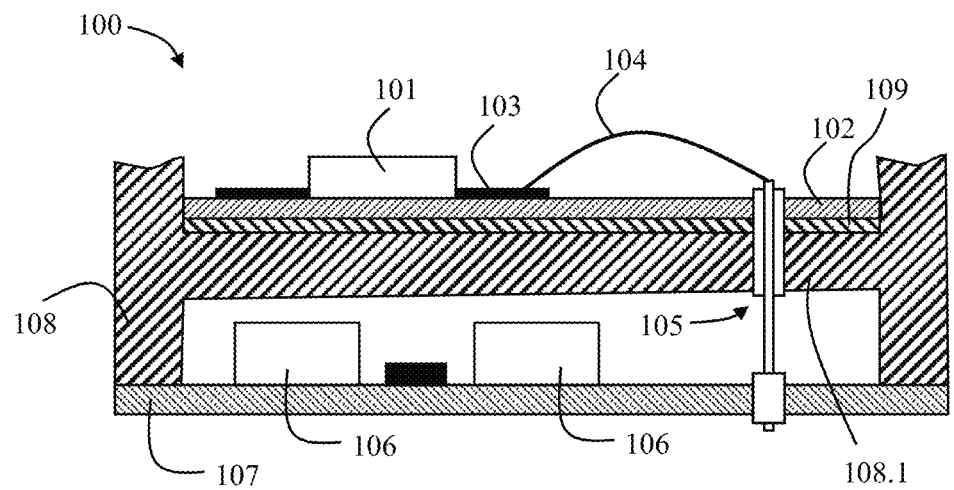
FIG. 1 shows a schematic cross-sectional view of a module.
Figure 2:
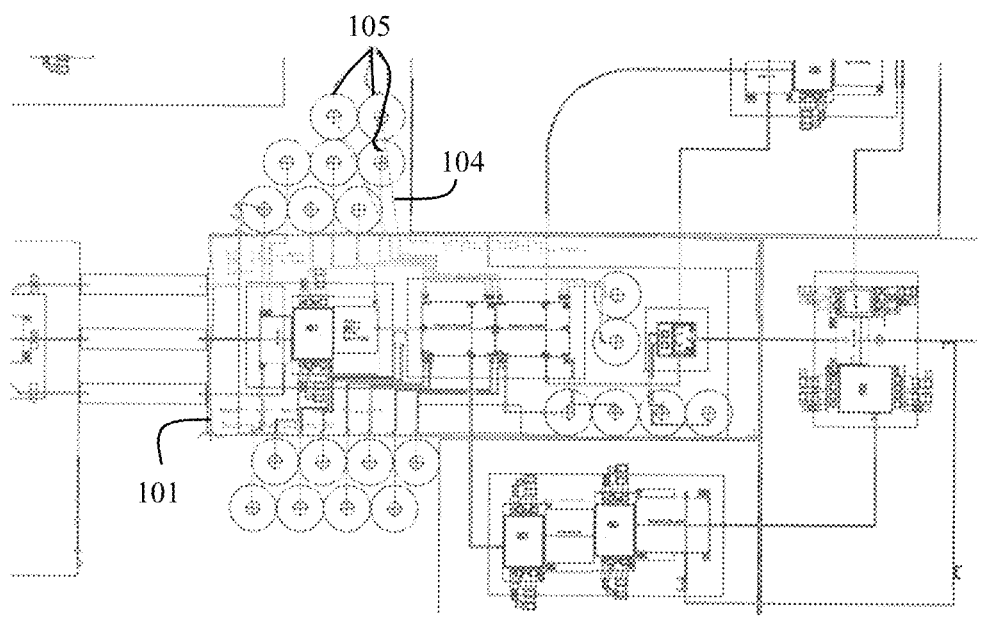
FIG. 2 shows a schematic plan view of a module according to the type shown in FIG. 1.

The microwave frequency circuit submodule 2 may comprise a microwave frequency circuit substrate 21, which may be a thin film substrate and/or may comprise a ceramic material. In particular, the microwave frequency circuit substrate 21 may be a circuit board. The microwave frequency circuit submodule 2 may comprise a microwave device 22, such as a microwave monolithic integrated circuit (MMIC), an amplifier, a filter, and/or a device for increasing the frequency of a microwave signal. The microwave device 22 may be arranged on the microwave frequency circuit substrate 21. The microwave frequency circuit submodule 2 may comprise one or more conductors 23 (e.g., microwave conductors), such as one or more conducting tracks, wherein the conductor(s) 23 may be arranged on the microwave frequency circuit substrate 21 and/or electrically connected to the microwave device 22.

The hybrid module 1 comprises a low frequency circuit submodule 3 which is arranged opposite to the microwave frequency circuit submodule 2, and which is configured to supply the microwave frequency circuit submodule 2 with an electrical signal having a low frequency. Thus, the low frequency circuit submodule 3 is electrically connected to the microwave frequency circuit submodule 2 via, or through, a connection, so that via this connection the low frequency circuit submodule 3 can supply the microwave frequency circuit submodule 2 with the electrical signal. The electrical signal may be, for example, a voltage, such as a Direct Current (DC) voltage, a ground connection, a current, and/or a signal, such as an AC signal, a control signal (for controlling the microwave frequency circuit submodule 2 in a specific manner). The high frequency is at least two times higher than the low frequency. The low frequency may have a value in the range of from 0 GHZ (no frequency) to ⅒ of the high frequency, such as in a range from 0 GHz to 2 GHz or less, in particular 1 GHz or less.

The low frequency circuit submodule 3 may comprise a low frequency circuit substrate 31. The low frequency circuit submodule 3 may comprise one or more low frequency devices 32 which may be configured to provide, and/or generate, the electrical signal. The low frequency circuit submodule 3, such as the at least one low frequency device 32, may be connectable to electricity, such as to an electrical power means, e.g. a voltage and/or current source. The at least one frequency device 32 may be arranged on the low frequency circuit substrate 31. The low frequency circuit submodule 3 may comprise a conductive structure 33, 34 which may comprise a (first) conductor 33, e.g. in the form of a via, and/or a (second or further) conductor 34, e.g. in the form of a conducting track. Thus, the electrical connection between the submodules 2, 3 may be at least via the conductive structure 33, 34.

The low frequency circuit submodule 3 may comprise a shielding against radiation, in particular microwave radiation and/or radiation leaking from the microwave frequency circuit submodule 2. By the shielding, electrical devices and/or conductors of the low frequency circuit submodule 3 are prevented from being interfered due to such a radiation. The shielding may be arranged on, and/or integral with, the low frequency circuit substrate 31. The shielding may comprise a conductive material and/or a microwave absorbing material.

The hybrid module 1 comprises a first conductive housing part 4 and a second conductive housing part 5. The first conductive housing part 4 houses at least a part of, optionally only a part of, the low frequency circuit submodule 3.

The second conductive housing part 5 house at least a part of, optionally the whole of, the microwave frequency circuit submodule 2. The housing parts 4, 5 act as a shielding for (high frequent) electromagnetic radiation into and out of the module 1, and as a heat sink for the module 1, i.e. for conducting heat generated during use of the module 1 away from the module 1, such as into the environment surrounding the module 1.

The first conductive housing part 4 may delimit one or more receiving rooms 41 in which at least part of the low frequency circuit submodule 3, such as at least part of the device 32, is arranged, and/or which extends above at least part of the submodule 3, such as above the low frequency circuit substrate 31. In particular, the device 32 may extend into or in the one or more receiving rooms 41, whereas the low frequency circuit substrate 31 does not extend into or in the one or more receiving rooms 41. At least part of the low frequency circuit submodule 3 is exposed to the one or more receiving rooms 41, such as a gas (such as air) or vacuum within the one or more receiving rooms 41, so that heat generated during operation of the low frequency circuit submodule 3 can be transferred directly into the one or more receiving rooms 41 and then into the first conductive housing part 4.

Figure 4:
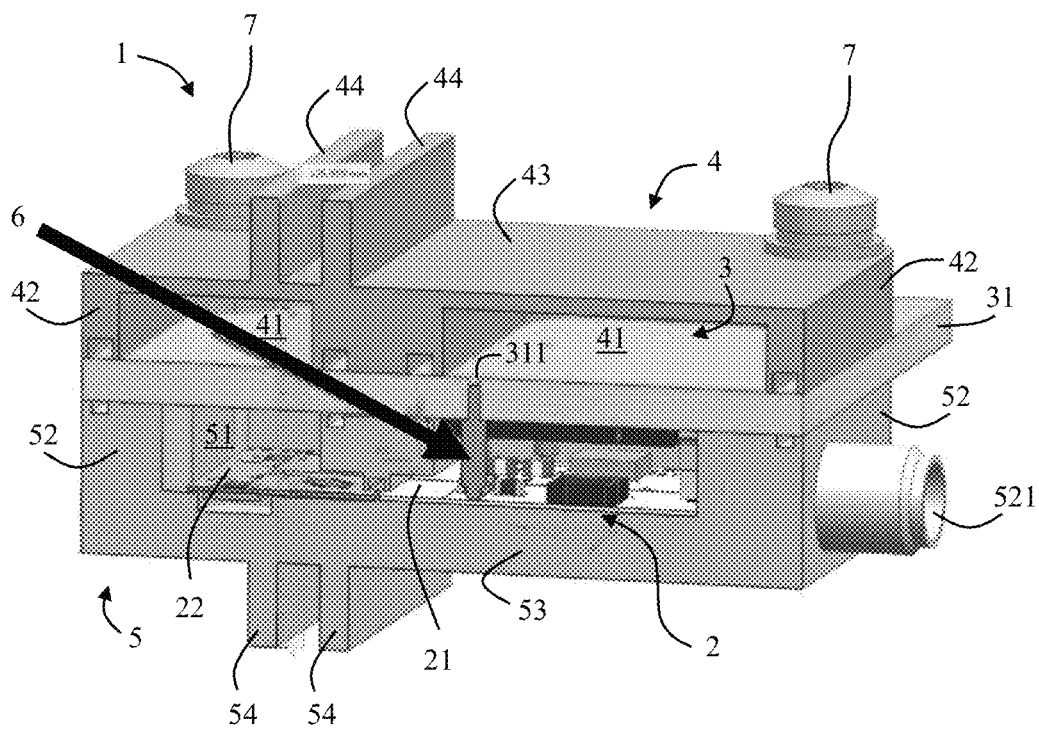
FIG. 4 shows a schematic perspective view of a hybrid module according to an embodiment of the present disclosure.
Figure 6:
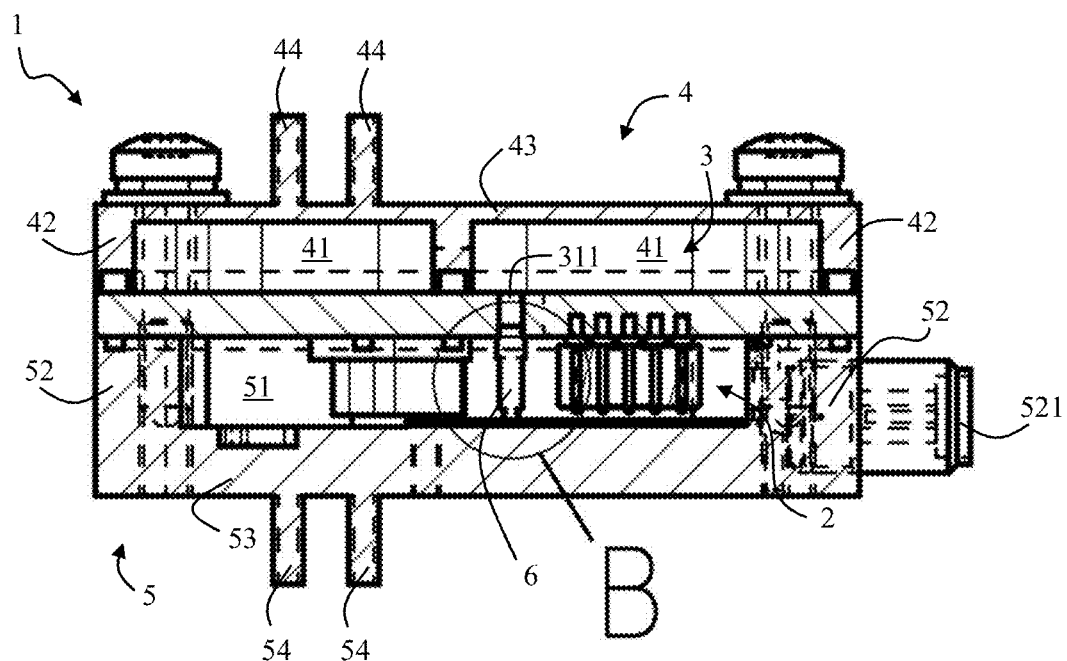
FIG. 6 shows a schematic cross-sectional view of the module shown in FIG. 5, taken along A-A indicated in FIG. 5.

The first conductive housing part 4 may comprise one or more side walls 42 that delimit(s) the one or more receiving rooms 41, e.g. at a lateral side of the one or more receiving rooms 41. The first conductive housing part 4 may comprise a (top) wall 43 from which the one or more side walls 42 may extend. The one or more side walls 42 may extend transversely, such as perpendicularly, with respect to the wall 43. In particular, the cross-section of the first conductive housing part 4 may comprise a U-shape (such as a plurality of U-shapes, which may be juxtaposed, as shown in FIGS. 4 and 6, e.g. to provide a plurality of receiving rooms 41) which may be defined by the wall(s) 42 and/or the wall 43.

Figure 3:
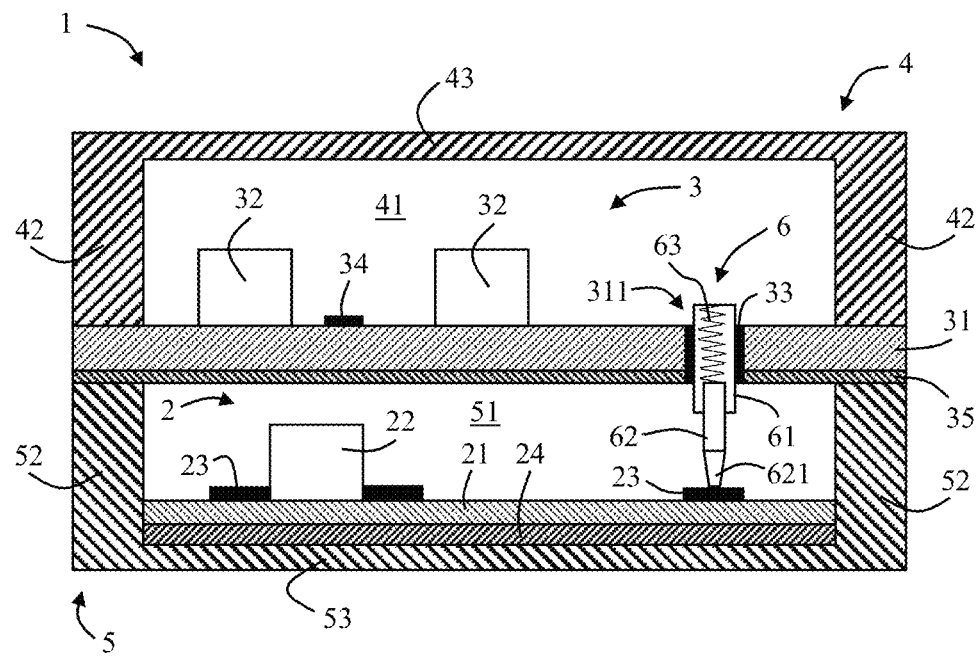
FIG. 3 shows a schematic cross-sectional view of a hybrid module according to an embodiment of the present disclosure.

The first conductive housing part 4 may be arranged to cool at least the low frequency circuit submodule 3. An exemplary possibility for such a cooling is shown in FIG. 3. As shown, the first conductive housing part 4 may be in thermal contact, such as in a direct contact, with the low frequency circuit submodule 3, e.g. with the low frequency circuit substrate 31. In another embodiment, the first conductive housing part 4 may be in a different thermal contact with the low frequency circuit submodule 3, such as by an indirect contact that may use a thermal bond (e.g. a heat-conducting paste). The indirect contact may be between the first conductive housing part 4 and the low frequency circuit substrate 31. In particular, the one or more side walls 42 of the first conductive housing part 4 may be in thermal contact (such as in direct and/or in indirect contact) with the low frequency circuit submodule 3, such as the low frequency circuit substrate 31.

The second conductive housing part 5 may delimit one or more receiving rooms 51 in which at least part of the microwave frequency circuit submodule 2, optionally the whole of the microwave frequency circuit submodule 2, is arranged. In particular, the one or more receiving rooms 51 may be arranged such that high frequent microwave radiation (e.g. (high) frequent microwave signals) can move within the one or more receiving rooms 51 in order to interact with the microwave frequency circuit submodule 2, such as with the microwave device 22. As shown in FIG. 4, the hybrid module 1 may comprise a port 521, such as a connector, for the introduction of microwave radiation into the module 1 and to the microwave frequency circuit submodule 2. The port 521 may open into the one or more receiving rooms 51. At least part of the microwave device 22 and/or at least part of the microwave frequency circuit substrate 21 may be arranged in the one or more receiving rooms 51. At least part of the microwave frequency circuit submodule 2, such as at least the microwave frequency circuit substrate 21 and/or the microwave device 22, may be exposed to the one or more receiving rooms 51, such as a gas (such as air) or vacuum within the one or more receiving rooms 51. Thus, heat generated during operation of the microwave frequency circuit submodule 2 may be transferred directly into the one or more receiving rooms 51 and then into the second conductive housing part 5.

The second conductive housing part 5 may comprise one or more side walls 52 that delimit(s) the one or more receiving rooms 51, e.g. at a lateral side of the one or more receiving rooms 51. On one of the one or more side walls 52, the port 521 may be arranged. The second conductive housing part 5 may comprise a (bottom) wall 53 from which the one or more side walls 52 may extend. At least part of the microwave frequency circuit submodule 2, such as the microwave frequency circuit substrate 21, may be arranged on, and/or supported by, the wall 53. For example, the microwave frequency circuit submodule 2 may be directly supported or indirectly supported, in particular by a layer 24, on the wall 53. The one or more side walls 52 may extend transversely, such as perpendicularly, with respect to the wall 53. The cross-section of the second conductive housing part 5 may comprise, or may be, a U-shape, which may be defined by the wall(s) 52 and/or the wall 53.

The second conductive housing part 5 may be arranged to cool at least the microwave frequency circuit submodule 2 and, optionally, also the low frequency circuit submodule 3. An exemplary possibility for such a cooling is shown in FIG. 3. As shown, the second conductive housing part 5 may be in thermal contact with both the microwave frequency circuit submodule 2, such as the microwave frequency circuit substrate 21, and the low frequency circuit submodule 3, such as the low frequency circuit substrate 31. For example, the wall 53 is in thermal contact with the microwave frequency circuit submodule 2, such as the microwave frequency circuit substrate 21, wherein the one or more side wall(s) 52 is/are in thermal contact with the low frequency circuit submodule 3, such as the low frequency circuit substrate 31. As shown, the microwave frequency circuit substrate 21 may be in direct contact with the second conductive housing part 5 (e.g. via the lateral sides of the microwave frequency circuit substrate 21) and/or in direct contact or indirect contact (e.g. via the layer 24) with the second conductive housing part 5. The layer 24 may be a (highly) heat-conductive layer.

The low frequency circuit substrate 31 of the low frequency circuit submodule 3 may comprise a conductive layer 35 that may be connected to ground. The conductive layer 35 is arranged to provide an additional shielding (in particular for radiation emitted by the microwave frequency circuit submodule 2) and may be also arranged to aid in cooling the hybrid module 1. The conductive layer 35 may be a conductive cover layer, which means that the conductive layer 35 may represent an outermost layer of the low frequency circuit substrate 31. In particular, the conductive layer 35 may be arranged to face the microwave frequency circuit submodule 2, whereby a particularly effective shielding is provided. Optionally, the conductive layer 35 may be exposed (i.e. in direct contact) to the one or more receiving rooms 51 delimited by the second conductive housing part 5. The conductive layer 35 may comprise a conductive material such as metal.

The low frequency circuit submodule 3 may be arranged to delimit the one or more receiving rooms 51 which is, on the other hand, delimited by the second conductive housing part 5. In other words, the low frequency circuit submodule 3 may act as a lid for the second conductive housing part 5, so that, for example, the middle part 108.1 of the metal housing 108 shown in FIG. 1 can be omitted. The second conductive housing part 5 may comprise an opening for accessing the one or more receiving rooms 51, wherein the opening may be delimited by the one or more side walls 52. The low frequency circuit submodule 3 may then be arranged to cover at least part of this opening. For example, the low frequency circuit substrate 31, such as the conducting layer 35, is arranged to delimit, or at least partly close, the one or more receiving rooms 51, e.g. by covering at least part of the opening.

As shown in FIG. 3, at least part of the low frequency circuit submodule 3, such as the low frequency circuit substrate 31, which optionally includes the conductive layer 35, may be arranged, and/or sandwiched, between the housing parts 4, 5. Thereby, the housing parts 4, 5 may not be in direct contact with one another; rather, they are in in direct contact with one another, namely via at least part of the low frequency circuit submodule 3, such as via the low frequency circuit substrate 31, e.g. including the conductive layer 35 which may be in direct contact with the second conductive housing part 5 such as with a side wall 52. In the assembled state, the low frequency circuit substrate 31 may protrude from the first and/or second conductive housing parts 4, 5, such as from one of the side walls 42 and/or 52.

Figure 5:
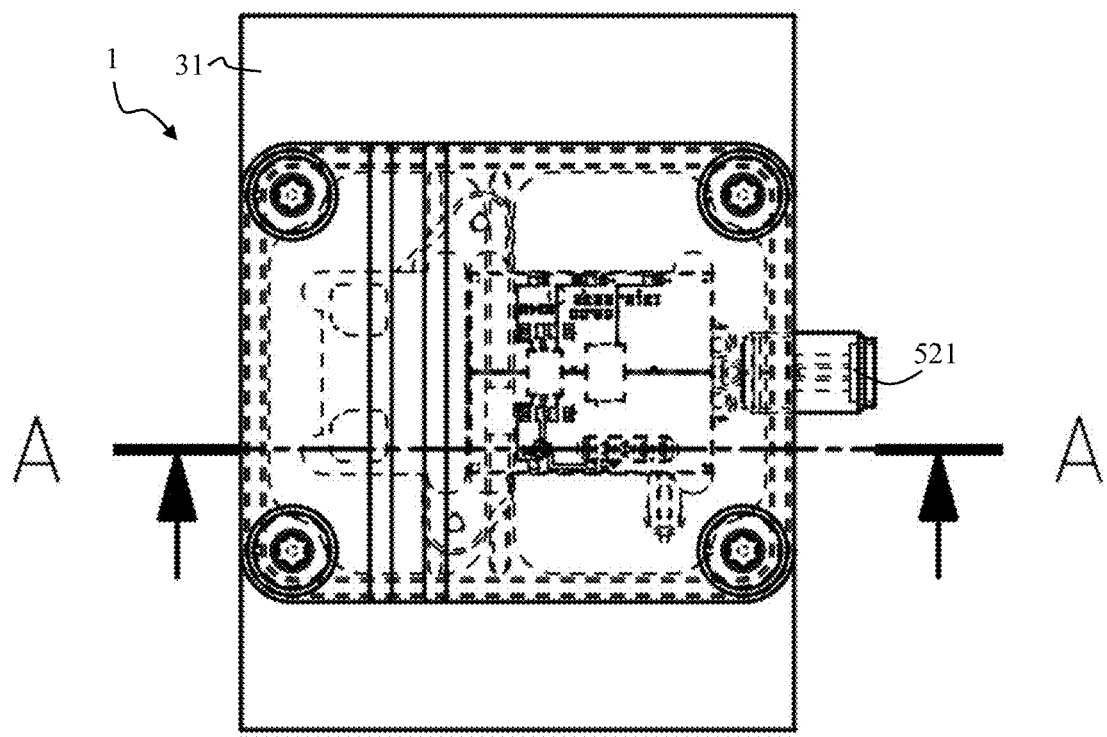
FIG. 5 shows a schematic plan view of a hybrid module according to an embodiment of the present disclosure.

As shown in FIGS. 4-6, the first conductive housing part 4 may comprise one or more cooling fins (ribs) 44 in order to increase a cooling effect provided by the first conductive housing part 4. As shown, there may be only two cooling fins 44. However, in other embodiments, the cooling fins 44 may be also provided in a different number, such as only one cooling fin 44 or more than two cooling fins 44. The one or more cooling fins 44 may extend away from the one or more receiving rooms 41. For example, the one or more cooling fins 44 extend, or protrude, from a backside of the wall 43, wherein the front side of the wall 43 is exposed to the one or more receiving rooms 41.

The second conductive housing part 5 may (e.g. also) comprise one or more cooling fins (ribs) 54 in order to increase a cooling effect provided by the second conductive housing part 5. As shown, there may be only two cooling fins 54. However, in other embodiments, the cooling fins 54 may be also provided in a different number, such as only one cooling fin 54 or more than two cooling fins 54. The one or more cooling fins 54 may extend away from the one or more receiving rooms 51. For example, the one or more cooling fins 54 extend from a backside of the wall 53, wherein the front side of the wall 53 supports at least part of the microwave frequency circuit submodule 2.

The first and second conductive housing parts 4, 5 are not limited to a specific material. At least one, or each, of the first and second conductive housing parts 4, 5 may comprise a conductive material, such as metal. For example, at least one or each of the first and second conductive housing parts 4, 5 may comprise a material comprising metal such as copper. In one embodiment, the second conductive housing part 5 comprises a metal coating, such as a gold coating, wherein, optionally, the first conductive housing part 4 is free of a gold coating. The gold coating may be arranged so as to be in contact with, and/or pressed against, the low frequency circuit submodule 3, such as the low frequency circuit substrate 31, and/or the microwave frequency circuit submodule 2, such as the microwave frequency circuit substrate 21, and/or the layer 24.

As shown in FIG. 4, the housing parts 4, 5 may be attached to one another by a fastening connection 7, such as a screw connection, as shown, and/or a clamp connection and/or a snap fit connection. The hybrid module may comprise at least two fastening connections 7. The fastening connection 7 may go, or extend, from the first conductive housing part 4 (e.g. through the first conductive housing part 4) into the second conductive housing part 5. For example, by tightening a screw of the screw connection, a clamping force is applied to the low frequency circuit module 3, such as to the low frequency circuit substrate 31.

To provide a (electrical) connection, between the submodules 2, 3, for supplying the microwave frequency circuit submodule 2 with the electrical signal, the hybrid module 1 comprises a resilient pin 6. The resilient pin 6 is mounted to the low frequency circuit submodule 3, e.g. at least partly mounted in the low frequency circuit submodule 3. The resilient pin 6 may be mounted to the low frequency circuit submodule 3 with or without a fastening means. For example, the low frequency circuit submodule 3 comprises an opening 311 in which at least part of the resilient pin 6 is arranged. By using the opening 311, the resilient pin 6 may be mounted to the low frequency circuit submodule 3. For example, the resilient pin 6 is fitted (e.g. by a press- and/or transitional fit and/or a form fit) into the opening 311. As shown in FIG. 3, the opening 311 may be a through opening (such as a through hole) that may extend through the low frequency circuit substrate 31 and/or the conductive layer 35. In other embodiments, the opening 311 may be provided differently, e.g. in the form of a recess extending in the low frequency circuit substrate 31 (and thus, e.g., in the layer 35), but not through the low frequency circuit substrate 31.

At a first end, the resilient pin 6 is electrically connected to the low frequency circuit submodule 3. In the embodiment shown in FIG. 3, the resilient pin 6 is in electrical contact with the low frequency circuit substrate 31 and/or the conductor 33 in order to be electrically connected to the low frequency circuit submodule 3. Therefore, the electrical signal may be provided (e.g. send from, and/or supplied by, the low frequency circuit submodule 3) to the microwave frequency circuit submodule 2 by using at least the low frequency circuit substrate 31 and/or conductor 33 on the one hand and the resilient pin 6 on the other hand. At least part of the conductor 33 may be arranged in the opening 311, e.g. arranged on, or applied to, a wall delimiting the opening 311. For example, by galvanizing said wall the conductor 33 may be provided in the opening 311. The conductor 33 may extent from the front side of the low frequency circuit substrate 31 to the backside of the low frequency circuit substrate 31, such as from the one or more receiving rooms 41 to the one or more receiving rooms 51.

At a second end, the resilient pin 6 releasably contacts (e.g. from above) the microwave frequency circuit submodule 2, e.g. the conductor 23 of the microwave frequency circuit submodule 2, in order to be electrically connected to the microwave frequency circuit submodule 2. Thus, by this releasable contact, which is provided between the resilient pin 6 and the microwave frequency circuit submodule 2, and which is effected by the resiliency of the resilient pin 6, the connection between the submodules 2, 3 for the electrical signal is provided. The releasable contact enables that at least part of the resilient pin 6 can be moved away from a contact region (e.g. the conductor 23) of the microwave frequency circuit submodule 2, thereby separating the electrical connection between the submodules 2, 3. The releasable contact also facilitates a compensation of manufacturing tolerances between the submodules 2, 3. For example, by the resilient pin 6 in the so provided releasable contact, a smaller than expected distance between contact regions of the submodules 2, 3 does not result in undesired forces between the submodules 2, 3 and/or a greater than expected distance between the contact regions of the submodules 2, 3 does not result in a separated electrical connection (because the resilient pin 6 is biased into a contact position with the microwave frequency circuit submodule 2).

The resilient pin 6 provides several advantages. For example, the resilient pin 6 provides the advantage that connections using a firm or material bond (e.g. by using brazing, soldering, bonding and/or welding) can be eliminated or at least significantly reduced. In particular, the electrical connection between the submodules 2, 3 and provided by the resilient pin 6 is such that the electrical connection between the submodules 2, 3 can be separated without resolving a non-releasable connection, such as by removing a firm or material bond (such as a brazed, soldered, and/or welded connection). The electrical connection can be separated, or disconnected, by simply moving a part of the resilient pin 6 away from the microwave frequency circuit submodule 2. In particular, by the resilient pin 6, parts of the hybrid module 1, in particular the electrical connection between the submodules 2, 3, or even all of the hybrid module 1 can be rendered free of a feedthrough filter, such as the feedthrough filter 105 used in the module 1 shown in FIG. 1, which greatly simplifies the manufacturing of the hybrid module 1. Also, manufacturing techniques involved in using a feedthrough filter (pressing, brazing, soldering, etc.) can be eliminated, further reducing costs.

With a significantly reduced number of feed through filters, or even without any feedthrough filter, the hybrid module 1 is made more compact and easily produced.

Figure 7:
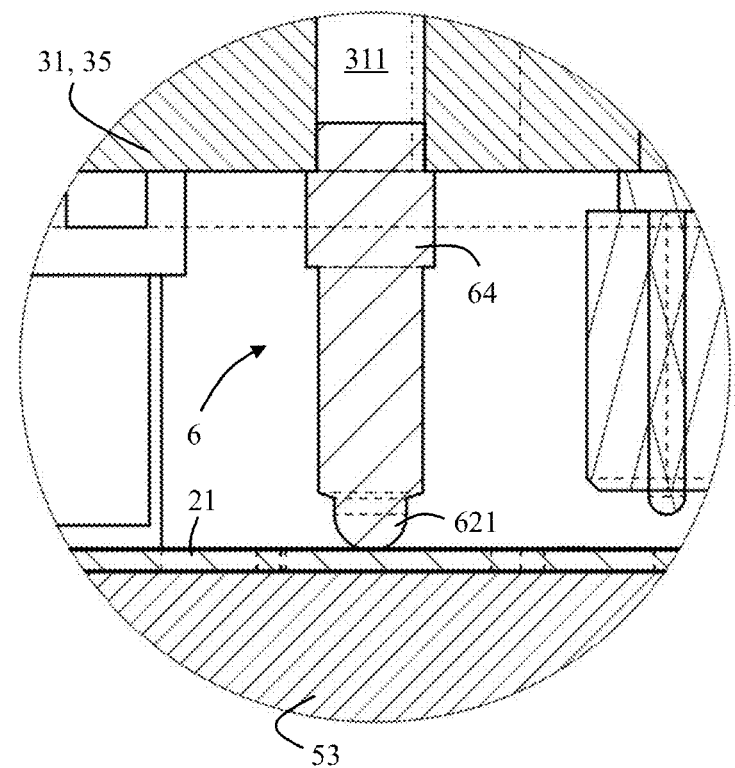
FIG. 7 shows a schematic detail view of the detail B indicated in FIG. 6.

The resilient pin 6 is not limited to a specific arrangement with respect to the microwave frequency circuit submodule 2 and/or the low frequency circuit submodule 3. As shown in, for example, FIG. 3, the resilient pin 6 may extend, and/or protrude, into the one or more receiving rooms 51 delimited by the second conductive housing part 5 and contact the microwave frequency circuit substrate 21. The resilient pin 6 may also extend into the one or more receiving rooms 41 delimited by the first conductive housing part 4. Alternatively, as shown in FIGS. 4, 6 and 7, the resilient pin 6 may extend not into the one or more receiving rooms 41. In this case, the resilient pin 6 may terminate in the opening 311. The resilient pin 6 may extend transversely, such as perpendicularly, with respect to the low frequency circuit substrate 31 of the low frequency circuit submodule 3. The resilient pin 6 may extent through at least part of the low frequency circuit substrate 31, such as at least through the layer 35.

By the hybrid module 1, the electrical signal (such as a voltage) can be fed directly next to the microwave frequency circuit submodule 2, whereby also bond connections for cross connections can be eliminated or at least significantly reduced. The electrical signal is not required to be fed only at a rim of the microwave frequency circuit submodule 2 (e.g. at a rim of the microwave frequency circuit substrate 21).

FIG. 3 shows an example of the resilient pin 6. As shown, the resilient pin 6 may comprise a base part 61 and an end part (or tip part) 62. The base part 61 may be mounted to the low frequency circuit submodule 3, e.g. into the opening 311. The base part 61 may be in electrical contact with the low frequency circuit submodule 3, e.g. the conductor 33. In particular, the base part 61 may be firmly mounted to the low frequency circuit submodule 3 (e.g. by using a press- or transitional-fit and/or a form fit), in particular such that the base part 61 cannot move relative to the low frequency circuit submodule 3. The end part 62 is movable relative to the base part 61 and moveable relative to the microwave frequency circuit submodule 2, in particular movable such that the end part 62 can be moved between a released position and a contact position. In the released position, the end part 62, and thus the resilient pin 6, is released (and thus moved away) from the microwave frequency circuit submodule 2, whereby the electrical connection between the submodules 2, 3 is separated. In the contact position, the end part 62, and thus the resilient pin 6, releasably contacts the microwave frequency circuit submodule 2 in order to provide the electrical connection between the submodules 2, 3 for the provision (such as transmission) of the electrical signal.

The resilient pin 6 may comprise a resilient element 63, such as a spring and/or another elastic element such as a rubber element. At least part of the resilient element 63 may be arranged in the base part 61, such as in a space defined by the base part 61. Thus, having the resilient element 61, the resilient pin 6 may have its feature of being resilient. One end of the resilient element 63 may be connected to the base part 61, while another end of the resilient element 63 may be connected to the end part 62. In particular, the whole of the resilient element 63 may be arranged in the base part 61.

The end part 62 may be moveable in an axial direction of the resilient pin 6. The end part 62 may be guided by, and/or guided in, the base part 61. The guidance may be along a (straight) axis, wherein the base part 61 and the end part 62 and, optionally, the resilient element 63 may be arranged along said axis. The end part 62 may protrude out of the base part 61, e.g. such that always some part of the end part 62 extends within the bottom part 61. The end part 62 may comprise, e.g. at its tip or distal end, a contact region 621 for releasably contacting the microwave frequency circuit submodule 2 in order to provide the (electrical) connection between the submodules 2, 3. As shown in FIG. 7, the contact region 621 may comprise a curved shape. In other embodiments, the contact region 621 may have alternatively, or additionally, a flat or angled shape.

As also shown in FIG. 7, the resilient pin 6 may comprise a widened section 64 provided such that the resilient pin 6 can extend into the opening 311 by only a defined extent. For example, the widened section 64 may be dimensioned larger than the opening 311, so that, as soon as said defined extent is reached, the widened section 64 is in contact with the low frequency circuit substrate 31, e.g. its conductive layer 35, thereby stopping any further movement into the opening 311.

While various embodiments of the present disclosure have been described above, it should be understood that they have been presented by way of example only, and not limitation. Numerous changes to the disclosed embodiments can be made in accordance with the disclosure herein without departing from the spirit or scope of the present disclosure. Thus, the breadth and scope of the present disclosure should not be limited by any of the above described embodiments. Rather, the scope of the present disclosure should be defined in accordance with the following claims and their equivalents.

Although the present disclosure has been illustrated and described with respect to one or more implementations, equivalent alterations and modifications will occur to others skilled in the art upon the reading and understanding of this specification and the annexed drawings. In addition, while a particular feature of the present disclosure may have been disclosed with respect to only one of several implementations, such feature may be combined with one or more other features of the other implementations as may be desired and advantageous for any given or particular application.

What is claimed is:

1. A hybrid module, comprising:
a microwave frequency circuit submodule configured for processing microwaves having a high frequency;
a low frequency circuit submodule,
wherein the low frequency circuit submodule is arranged opposite to the microwave frequency circuit submodule, and
wherein the low frequency circuit submodule is configured to supply the microwave frequency circuit submodule with an electrical signal having a low frequency, wherein the high frequency is at least two times higher than the low frequency;
a first conductive housing part that houses at least part of the low frequency circuit submodule;
a second conductive housing part that houses at least part of the microwave frequency circuit submodule; and
a resilient pin mounted to the low frequency circuit submodule, wherein the resilient pin is adapted to releasably contact the microwave frequency circuit submodule in order to provide, between the submodules, a connection, so that via the connection the low frequency circuit submodule can supply the microwave frequency circuit submodule with the electrical signal.

2. The hybrid module according to claim 1, wherein the high frequency is at least ten times higher than the low frequency and/or is 10 GHz or more.

3. The hybrid module according to claim 1,
wherein the low frequency circuit submodule comprises a low frequency circuit substrate.

4. The hybrid module according to claim 3,
wherein the low frequency circuit substrate comprises a conductive layer.

5. The hybrid module according to claim 4, wherein the conductive layer is a conductive cover layer, which faces the microwave frequency circuit submodule, or an intermediate or middle layer.

6. The hybrid module according to claim 3, wherein the low frequency circuit substrate comprises a conductor a via, wherein the resilient pin is in electrical contact with the conductor.

7. The hybrid module according to claim 1, wherein the low frequency circuit submodule comprises a through opening or a recess, wherein at least part of the resilient pin is arranged in the opening.

8. The hybrid module according to claim 1, wherein the microwave frequency circuit submodule comprises a microwave frequency circuit thin film substrate.

9. The hybrid module according to claim 8,
wherein the microwave frequency circuit substrate comprises ceramic.

10. The hybrid module according to claim 1,
wherein the second conductive housing part delimits one or more receiving rooms in which at least part of the microwave frequency circuit submodule is arranged, wherein the resilient pin extends into the one or more receiving rooms and contacts the microwave frequency circuit substrate.

11. The hybrid module according to claim 10,
wherein the low frequency circuit submodule delimits, or at least partly closes, the one or more receiving rooms.

12. The hybrid module according to claim 1,
wherein the resilient pin comprises a base part and an end part,
wherein the base part is mounted to the low frequency circuit submodule, and
wherein the end part is moveable relative to the microwave frequency circuit submodule and/or relative to the base part.

13. The hybrid module according to claim 12, wherein the resilient pin comprises a spring, wherein at least part of the spring is arranged in the base part.

14. The hybrid module according to claim 1, wherein at least part of the low frequency circuit substrate, and/or a sealing element is/are arranged, or sandwiched, between the housing parts.

15. The hybrid module according to claim 1, wherein the first conductive housing part is in thermal direct contact, with the low frequency circuit submodule, and/or wherein the second conductive housing part is in thermal contact, such as in direct contact, with the microwave frequency circuit submodule and/or the low frequency circuit submodule.

16. The hybrid module according to claim 1, wherein the first conductive housing part and/or the second conductive housing part comprise cooling fins.

17. The hybrid module according to claim 1, wherein the second conductive housing part comprises a a gold coating, wherein, the first conductive housing part is free of the gold coating.

18. The hybrid module according to claim 1, wherein the electrical signal is at least one of a DC voltage, an AC signal and a control signal.

19. The hybrid module according to claim 1,
wherein the connection between the submodules is free of a feedthrough filter.

20. A measuring device, comprising a hybrid module according to claim 1.

* * * * *